United States Patent [19]

Shekalim

[11] Patent Number: 5,586,727
[45] Date of Patent: Dec. 24, 1996

[54] FLOW REDUCER DEVICES AND DRIP IRRIGATION EMITTER INCLUDING SAME

[75] Inventor: Avraham Shekalim, Nesher, Israel

[73] Assignee: Hydromatic Ltd., Migdal Haemek, Israel

[21] Appl. No.: 348,173

[22] Filed: Nov. 28, 1994

[30] Foreign Application Priority Data

Dec. 24, 1993 [IL] Israel ........................................ 108171

[51] Int. Cl.⁶ .................................................... B05B 1/30
[52] U.S. Cl. ............................................ 239/542; 239/547
[58] Field of Search ....................................... 239/542, 547, 239/272, 273; 138/26, 42, 30, 37, 46

[56] References Cited

U.S. PATENT DOCUMENTS

| | | | |
|---|---|---|---|
| 4,254,791 | 10/1981 | Bron | 239/542 X |
| 4,824,025 | 4/1989 | Miller | 239/542 |
| 4,856,552 | 8/1989 | Hiemstra | 239/542 X |
| 5,183,208 | 2/1993 | Cohen | 239/542 |
| 5,203,503 | 4/1993 | Cohen | 239/542 X |
| 5,236,130 | 8/1993 | Hadar | 239/542 |
| 5,330,107 | 7/1994 | Karathanos | 239/533.1 |

FOREIGN PATENT DOCUMENTS

| | | |
|---|---|---|
| 0018088 | 10/1980 | European Pat. Off. . |
| 0295400 | 12/1988 | European Pat. Off. . |
| 0467386 | 1/1992 | European Pat. Off. . |
| 84393 | 11/1987 | Israel . |
| 9302547 | 2/1993 | WIPO . |

*Primary Examiner*—Lesley D. Morris
*Attorney, Agent, or Firm*—Benjamin J. Barish

[57] ABSTRACT

A flow reducer device particularly useful as a drip irrigation emitter, includes a body member having a flow regulating region formed with a cavity extending through the body member and closed at its opposite sides by a deformable diaphragm, preferably an elastomeric sleeve. The device is attachable to a tube of pressurized fluid such that the outer face of each diaphragm side is exposed to the fluid pressure at the fluid inlet, and the inner face of each diaphragm side is exposed to the fluid pressure within the cavity, such that the diaphragm sides deform towards or away from each other within the cavity to regulate the fluid flow.

16 Claims, 6 Drawing Sheets

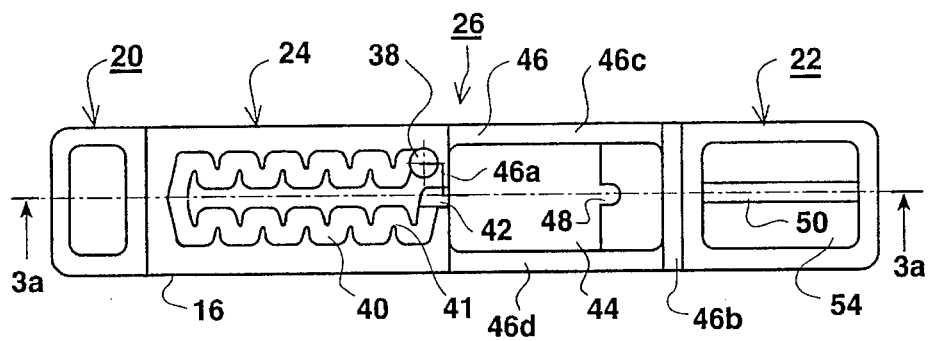
FIG.3
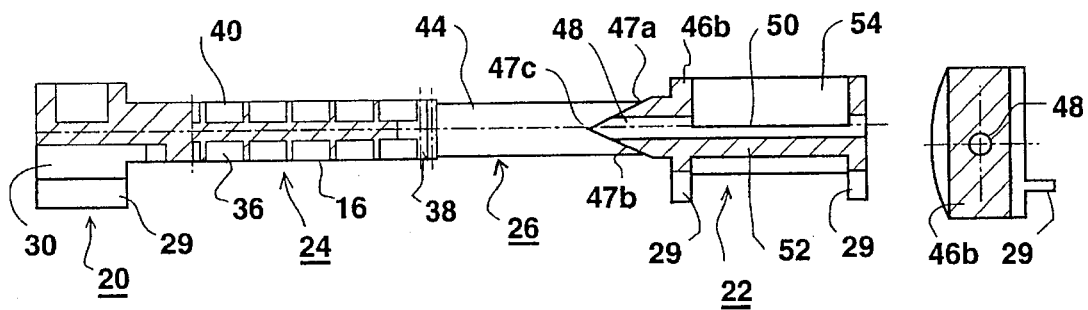
FIG.3a
FIG.4a
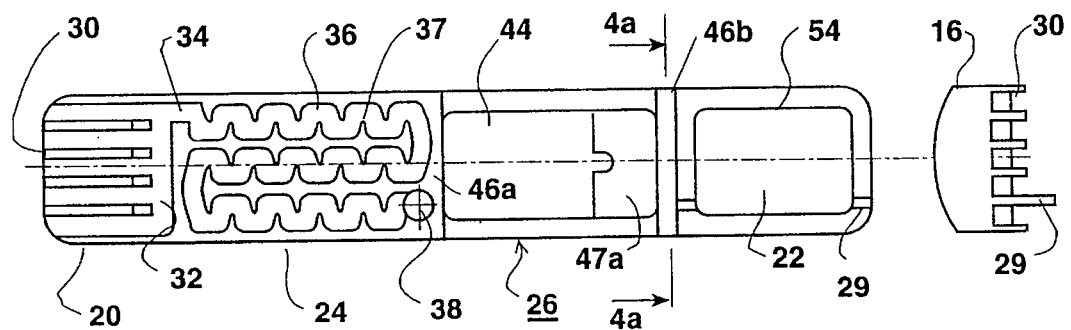
FIG.4
FIG.5

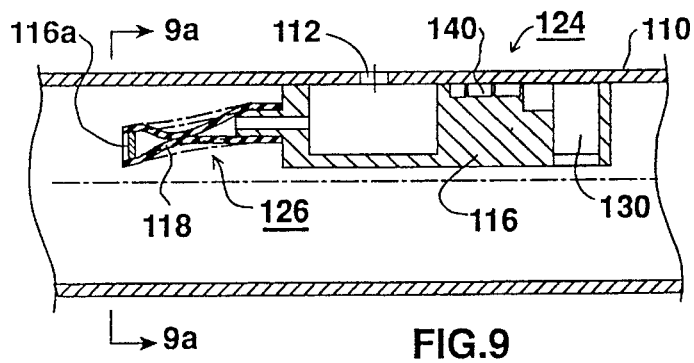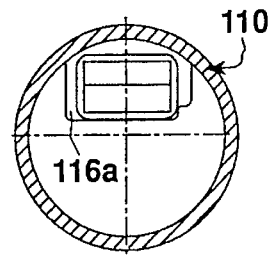
FIG.9     FIG.9a
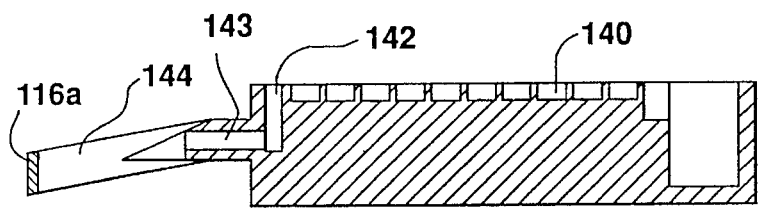
FIG.10a
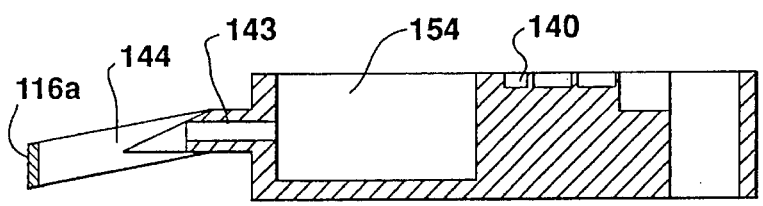
FIG.10b
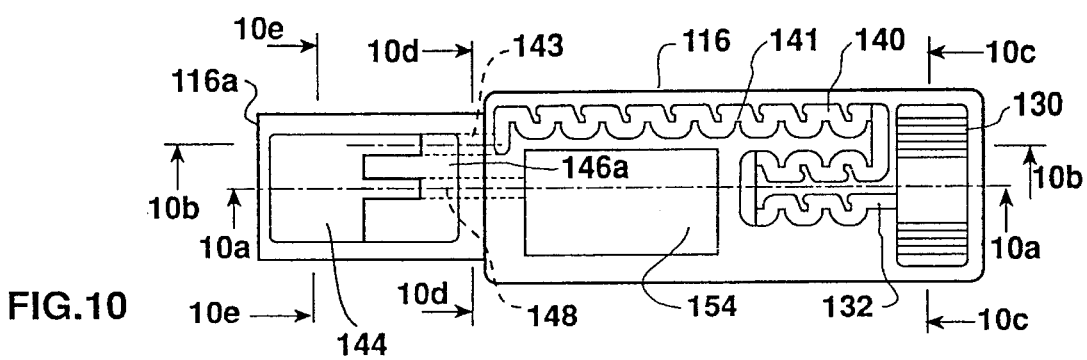
FIG.10
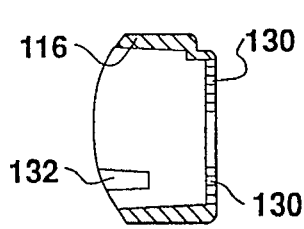 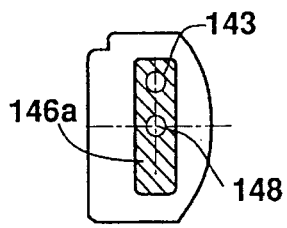 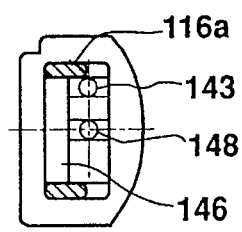
FIG.10c    FIG.10d    FIG.10e

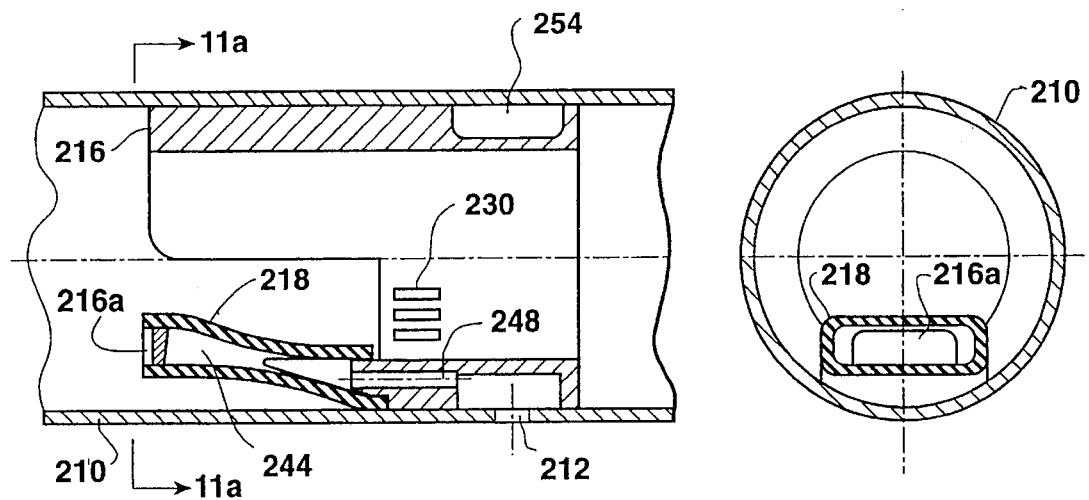
FIG.11
FIG.11a
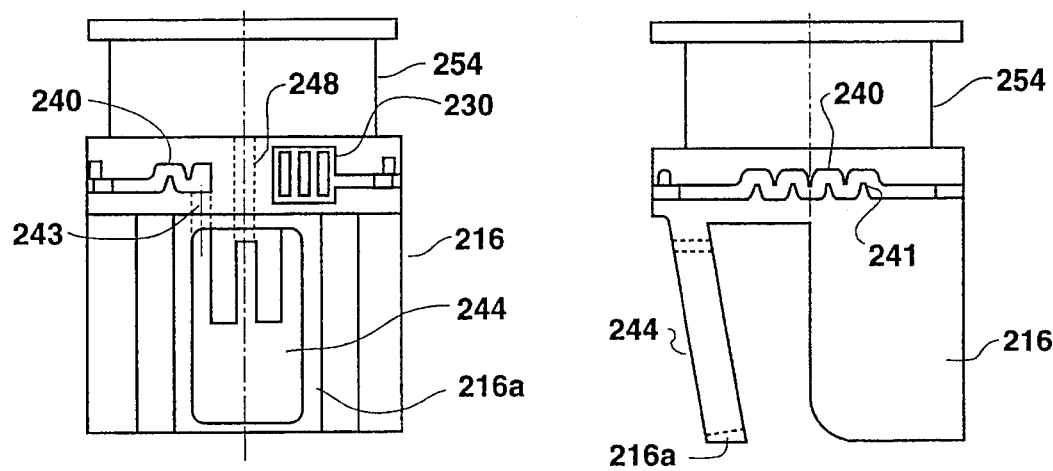
FIG.12
FIG.13

5,586,727

FLOW REDUCER DEVICES AND DRIP IRRIGATION EMITTER INCLUDING SAME

FIELD AND BACKGROUND OF THE INVENTION

The present invention relates to flow reducer devices for reducing the flow of a fluid under pressure. The invention is particularly useful for drip irrigation emitters and is therefore described below with respect to this application.

Drip irrigation systems are gaining widespread use for irrigating various types of crops because of their ability to feed the irrigating water directly to the root region of the crops. Many designs have been developed to regulate the output of such emitters in order to decrease variations in the output flow with variations in the inlet pressure, thereby enabling the drip irrigation emitters to be used in long spans and/or over uneven terrain. Many designs have also been developed to reduce the sensitivity of the emitters to clogging by particles within the irrigating water, thereby enabling the emitters to be used with lower grade irrigation water.

OBJECTS AND BRIEF SUMMARY OF THE INVENTION

An object of the present invention is to provide a flow reducer device particularly useful for drip irrigation and having advantages in one or both of the above respects. Another object of the invention is to provide a drip irrigation emitter including the novel flow reducer device.

According to one aspect of the present invention, there is provided a flow reducer device attachable to a tube of pressurized fluid for reducing the flow of the fluid therefrom, comprising a body member formed with a fluid inlet, a fluid outlet, and a flow regulating region between the inlet and outlet. The flow regulating region includes a cavity extending through opposite faces of the body member closed by a side of a deformable diaphragm at each of the opposite faces. The body member is further formed with an inlet passageway leading from the fluid inlet into the cavity, an outlet passageway leading from the cavity to the fluid outlet, and a plurality of baffles to define a labyrinth in the inlet passageway for reducing the pressure of the fluid flowing therethrough into the cavity. The device is attachable to a tube of pressurized fluid, e.g., a water supply line, such that the outer face of each diaphragm side is exposed to the fluid pressure at the fluid inlet, and the inner face of each diaphragm side is exposed to the fluid pressure within the cavity, whereby the diaphragm sides deform towards or away from each other within the cavity in response to changes in the inlet pressure to regulate the fluid flow via the cavity to the outlet passageway.

In the described preferred embodiments, the deformable diaphragm is in the form of a sleeve of elastomeric material to enclose the body member cavity.

As will be described more particularly below, the provision of a flow-regulating cavity closed by a deformable diaphragm, preferably in the form of an elastomeric sleeve, effectively regulates the flow through the outlet passageway in response to variations in the inlet pressure. Such a construction also has a low sensitivity to clogging since both sides of the elastomeric sleeve may yield outwardly in order to release clogging particles. In addition, this construction requires relatively simple parts which may be produced and assembled at low cost.

The invention also provides a drip irrigation emitter, both the integral-tube type (sometimes called a linear-source emitter), and also the tube-attachable type (sometimes called a point-source emitter), including the novel flow reducer device of the present invention.

Further features and advantages of the invention will be apparent from the description below.

BRIEF DESCRIPTION OF THE DRAWINGS

The invention is herein described, by way of example only, with reference to the accompanying drawings, wherein:

FIGS. 3, 4 and 5 are top, bottom and end views of the body member in the flow reducer device of FIG. 2;

FIGS. 3a and 4a are sectional views along lines 3a—3a of FIG. 3, and 4a—4a of FIG. 4, respectively;

FIG. 9 is a longitudinal sectional view illustrating an irrigation emitter including another form of flow reducer device constructed in accordance with the present invention; FIG. 9a being a transverse sectional view along line 9a—9a of FIG. 9;

FIG. 10 is a top plan view illustrating the body member in the flow reducer device of FIG. 9, FIGS. 10a, 10b, 10c, 10d and 10e being sectional views along lines 10a—10a, 10b—10b, 10c—10c, 10d—10d and 10e—10e, respectively of FIG. 10;

FIG. 11 is a longitudinal sectional view illustrating a drip irrigation emitter including a further form of flow reducer device constructed in accordance with the present invention, FIG. 11a being a transverse sectional view along line 11a—11a of FIG. 11;

and FIGS. 12 and 13 are side elevational views from different sides of the body member in the flow reducer device of FIG. 11.

DESCRIPTION OF PREFERRED EMBODIMENTS

The Embodiments of FIGS. 1–7

Figure 1:
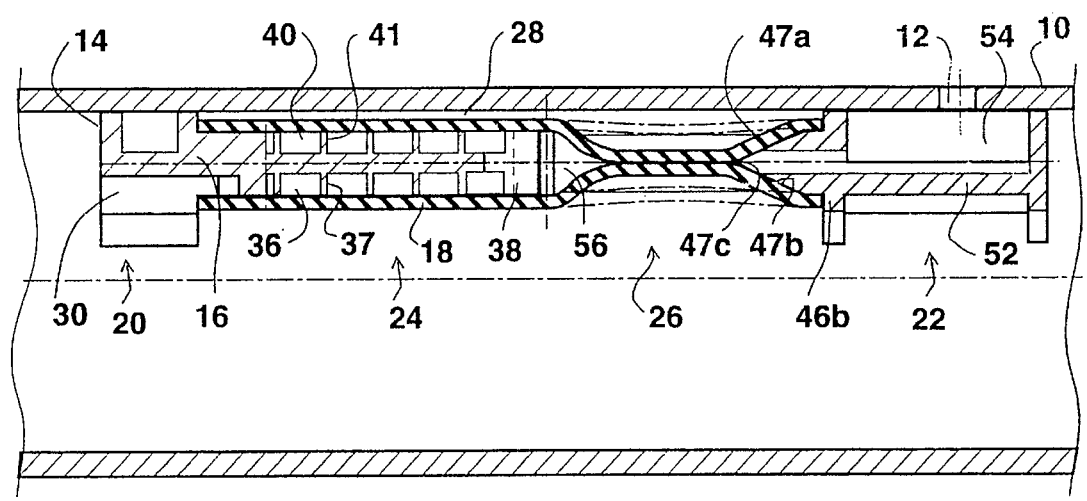
FIG. 1 is a longitudinal sectional view illustrating one form of flow reducer device constructed in accordance with the present invention as incorporated in an integral-tube type irrigation emitter.

FIG. 1 illustrates a water supply tube 10 adapted to be connected to a source of pressurized water and formed with a plurality of discharge holes 12 spaced longitudinally along its length. A flow reducer device, generally designated 14, is bonded to the inner face of tube 10 for each of the discharge holes 12 to reduce the flow of water through the respective hole. For simplification purposes, FIG. 1 illustrates only a section of tube 10 including one of the flow reducer devices 14 cooperable with a discharge hole 12.

Flow reducer device 14 includes a body member 16 of rigid plastic material, and a sleeve 18 of an elastomeric material enclosing the middle part of the body member. The opposite ends of body member 16 not enclosed by the elastomeric sleeve 18 serve, respectively, as an inlet region 20 and an outlet region 22 of the flow reducer device 14. Between these two regions are a pressure reducing region 24 which reduces the water pressure, and a flow-regulating region 26 which regulates the flow to the outlet region 22 in response to the differential pressure between the outer and inner faces of the elastomeric sleeve 18, as will be described more particulary below.

Figure 2:
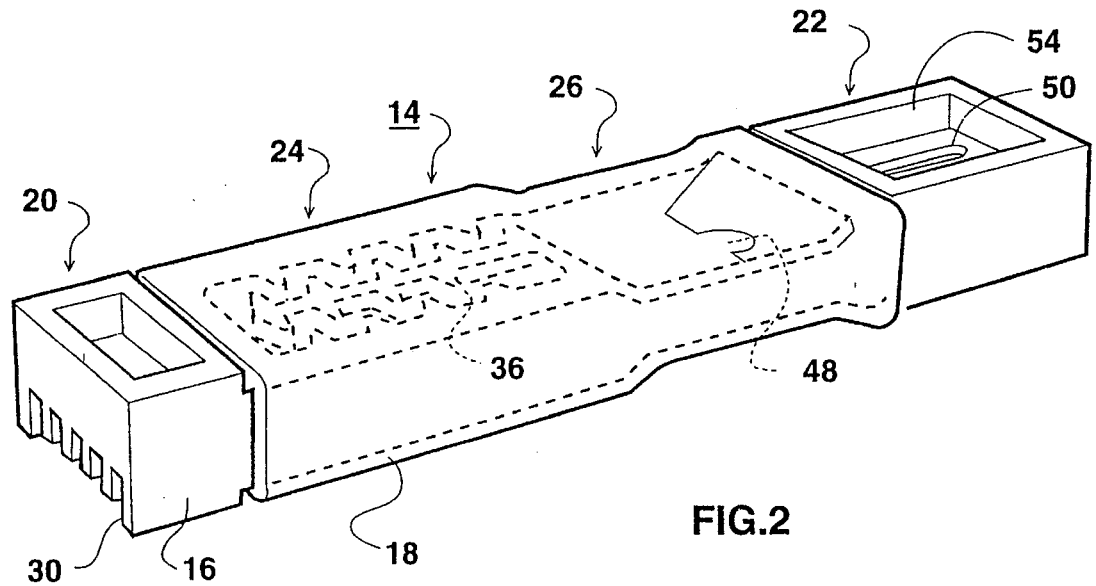
FIG. 2 is a three-dimensional view of the flow reducer device of FIG. 1.

The flow reducer device illustrated in FIG. 2 is attached, e.g., by heat-welding, to the inner surface of tube 10 at the inlet region 20 and the outlet region 22, both of which project slightly outwardly of the other two regions 24, 26. The latter two regions are thus spaced from the inner surface of tube 10, as shown at 28, so that the outer faces of sleeve 18 at the two regions 24 and 26 are subject to the pressure of the water within the tube.

The inner face (bottom face in FIG. 1) of the inlet region 20 of body member 16 is formed with a plurality of narrow axially-extending slits 30 which lead to a transversely-extending groove 32 (FIG. 4). The latter groove leads into the inlet 34 of a labyrinth passageway 36 defined by a plurality of baffles 37 fixed in the flow reducing region 24 of body member 16. Labyrinth 36 terminates in an opening 38 extending through body member 16 to communicate with one end of a second labyrinth passageway 40 (FIG. 3) defined by a second plurality of baffles 41 formed in the opposite face (upper face, FIG. 1) of body member 16. The opposite end of labyrinth passageway 40 terminates in a groove 42 leading into the flow-regulating region 26 of the flow reducer device 14.

The flow-regulating region 26 is defined by a large rectangular cavity 44 extending through the opposite faces of body member 16 and circumscribed by a peripheral wall 46 of rectangular configuration. Groove 42 is formed through section 46a of peripheral wall 46 and leads into one side of cavity 44. The other side of cavity 44 communicates with the outlet region 22 via an outlet bore 48 extending through the opposed section 46b of peripheral wall 46 midway between its outer opposed faces.

Section 46a of peripheral wall 46, as well as sections 46c and 46d of the peripheral wall, have flat perpendicular faces defining the respective sides of the rectangular cavity 44. The inner face of wall section 46b, however, is formed with inwardly-inclined faces, as shown at 47a and 47b, coming to an apex 47c at the axis of the outlet bore 48. Outlet bore 48 communicates, via a groove 50 formed in a wall 52, with a second cavity defining, when the flow reducer device 16 is fixed to the inner surface of tube 10, an outlet chamber 54 aligned with a discharge hole 12 formed in the tube. When the elastomeric sleeve 18 is mounted on the body member 16 as shown in FIG. 2, and the flow reducer device 14 is bonded to the inner face of tube 10 as shown in FIG. 1, the two labyrinths 36, 40 and recess 42 form an inlet passageway leading from the inlet 30 of the body member 16 into cavity 44; and the outlet bore 48 and groove 50 define an outlet passageway leading from the cavity to the outlet chamber 54 of the body member.

The flow reducer device operates as follows: Pressurized water within tube 10 passes through inlet slits 30, and grooves 32, 34 into labyrinth passageway 36 formed on the inner face (FIG. 4) of body member 16. The water then flows through labyrinth passageway 36, opening 38, labyrinth passageway 40 on the opposite face of the body member, groove 42 into cavity 44, outlet bore 48 from cavity 44 into the outlet chamber 54, and out through discharge hole 12 in the tube.

The two labyrinth passageways 36, 40 reduce the pressure and flow of the water before it enters cavity 44 via groove 42 so that the space 56 (FIG. 1) between the two inner faces of the elastomeric sleeve 18 is at a substantially lower pressure than the inlet pressure applied via space 28 to the two outer faces of the elastomeric sleeve. This differential pressure presses the center portions of the two sides of the elastomeric sleeve towards each other, as shown in FIG. 1, reducing the volume of the space 56 within the elastomeric sleeve, and thereby restricting the water flow via the outlet bore 48 and outlet chamber 54 to the water discharge hole 12.

As the inlet pressure increases, space 56 will correspondingly decrease in volume, so that at relatively high inlet pressures, the central portions of the two sides of the sleeve will be pressed against each other until the water flows only in a thin line between the inner surface of peripheral wall 46 and the pinched opposite sides of the elastomeric sleeve 18.

Figure 1A:
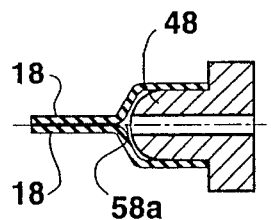
FIGS. 1a and 1b are fragmentary views illustrating possible variations in the construction of the flow reducer element of FIG. 1.
Figure 1B:
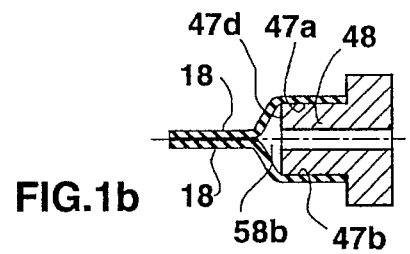

FIGS. 1a and 1b illustrate two variations in the configuration of the edge of peripheral wall 46b formed with the outlet bore 48 to prevent complete blockage of flow under very high inlet pressures. Thus, instead of having the slanted faces 47a, 47b of peripheral wall 46b come to a sharp edge, as illustrated particularly in FIGS. 1 and 3a, the sharp edge may be rounded as shown in FIG. 1a to produce a space 58a which better assures the flow path to the outlet bore 48 under high inlet pressure. FIG. 1b illustrates an alternative wherein faces 47a, 47b terminate in a relatively flat perpendicular face 47d.

Figure 6:
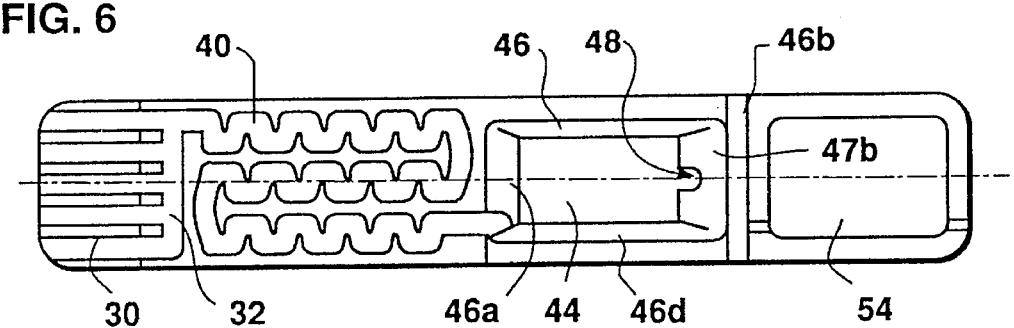
FIGS. 6 and 7 are bottom and top views, respectively, illustrating another form of flow reducer device constructed in accordance with the present invention, FIG. 7a being a sectional view along line 7a—7a of FIG. 7.
Figure 7:
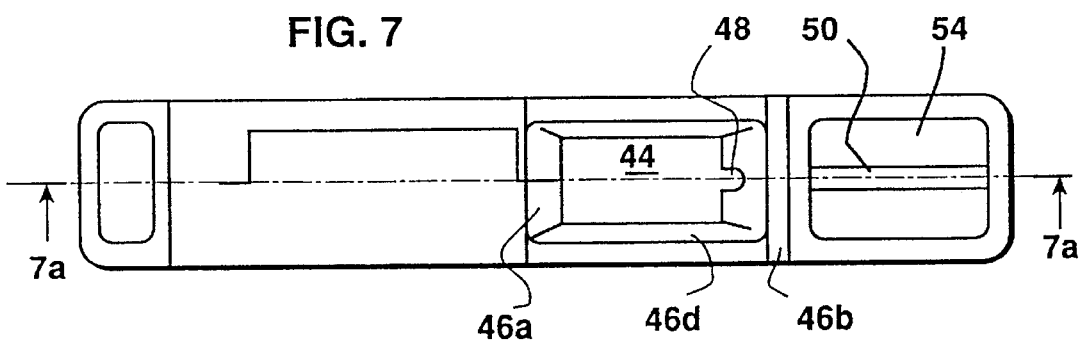
Figure 7A:
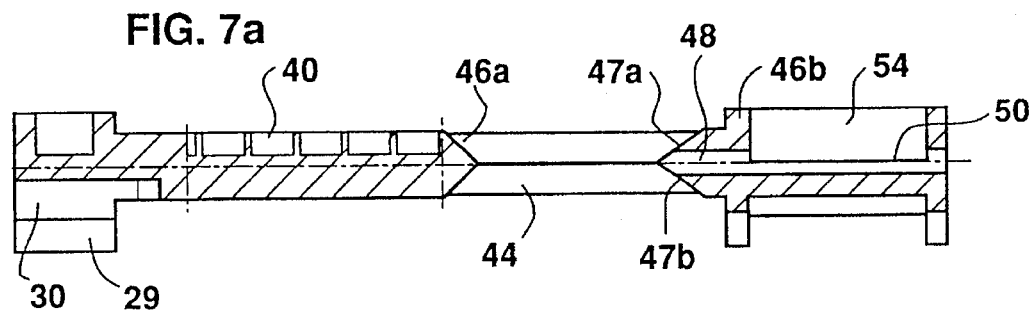

FIGS. 6 and 7 illustrate a variation wherein inwardly inclined faces (47a, 47b) are provided not only in wall 46b formed with the outlet bore 48, but also in the other three walls 46a, 46c, 46d defining the flow-regulating cavity 44. The variations in the configuration of the edge of peripheral wall 46b as illustrated in FIGS. 1a–1c, may also be provided in wall 46b or in one or more of the other peripheral walls 46a, 46c and 46d.

The illustrated constructions have a low sensitivity to clogging since both sides of the elastomeric sleeve 18 are yieldable to release any clogging particles. These constructions also eliminate the need for a special seal since the elastomeric sleeve 18 is effective to seal cavity 44 from the inlet pressure.

Figures 8, 8A:
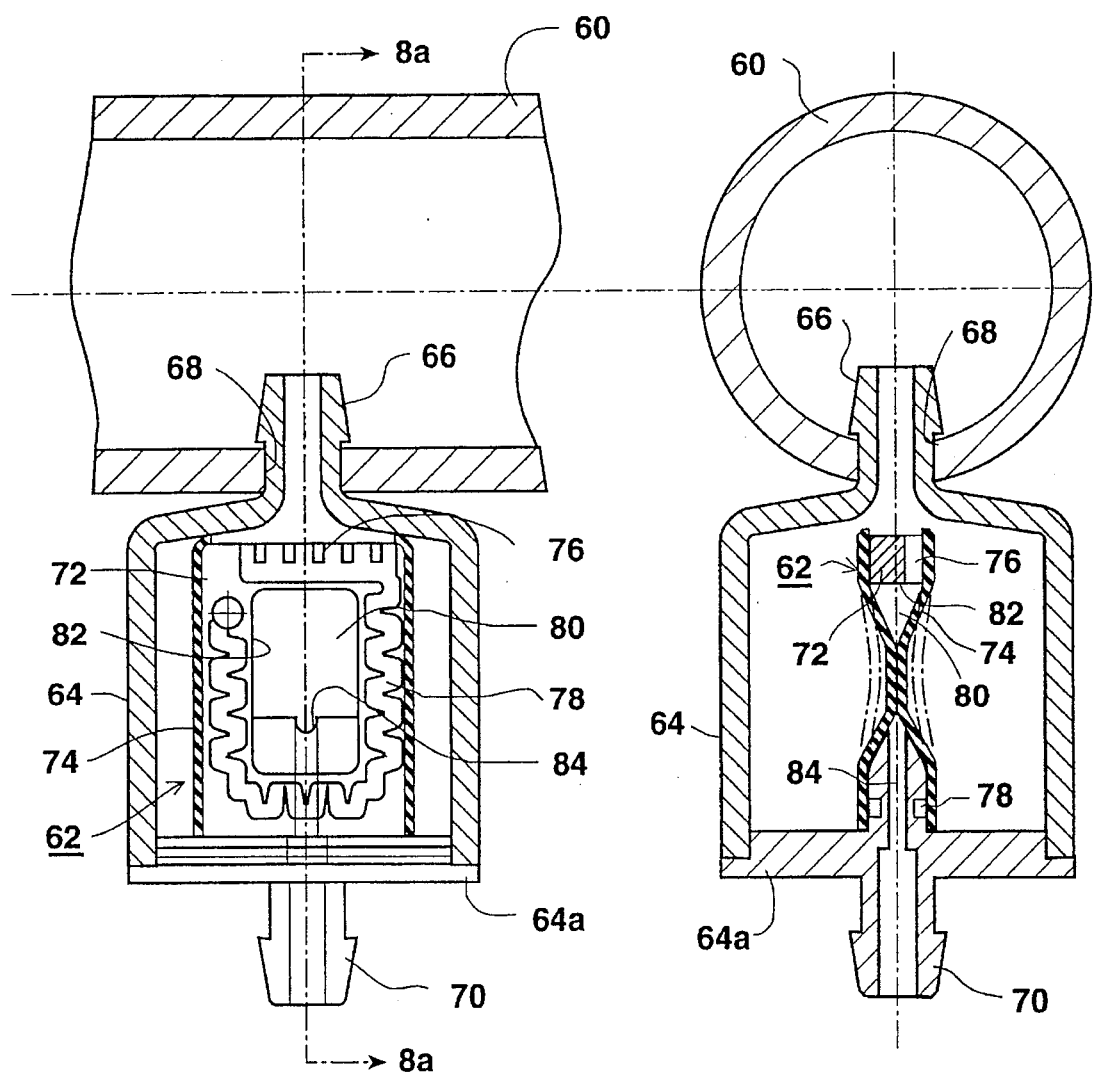
FIG. 8 is a longitudinal sectional view illustrating a flow reducer device constructed in accordance with the invention incorporated in a point-source emitter attachable to a tube.
FIG. 8a is a sectional view along line 8a—8a of FIG. 8.

The Embodiment Illustrated in FIGS. 8 and 8a

FIGS. 8 and 8a illustrate the flow reducer device described above used in a point-source dripper, i.e., a dripper attached to a water supply tube 60. In this case, the flow reducer device, generally designated 62, is enclosed within a housing 64 formed at one end with an inlet connector 66 insertable through an opening 68 in the water supply tube 60, and at the opposite end with an outlet nipple 70 through which the water is discharged at a low rate. The flow reducer device 62 within housing 64 also includes a body member 72 enclosed by an elastomeric sleeve 74 and formed with an inlet region 76 leading to a pressure reducing labyrinth passageway 78, which in turn leads to a flow regulating region 80. Region 80 is defined by a rectangular cavity 82 regulating the flow through an outlet bore 84 to the outlet nipple 70 in response to the differential pressure between the inlet and the outlet.

In the dripper illustrated in FIGS. 8 and 8a, outlet nipple 70 and body member 72 are both integrally formed with section 64a. The pressure reducing labyrinth passageways 78 are formed on the opposite faces of body member 72 as in FIGS. 1–7, but in this case these passageways substantially traverse three sides of the flow regulating cavity 80. Except for the foregoing differences, the flow reducer device 62 in FIGS. 8 and 8a is constructed and operates in substantially the same manner as described above.

The Embodiment of FIGS. 9–10e

FIGS. 9–10e illustrate a flow reducer device similar to those described earlier except that the elastomeric sleeve is applied only to the flow-regulating region 126 of the body member 116. Thus, the pressure reducing region 124 includes only one group of baffles 141 having outer faces engageable with the inner face of the tube 110 to define the pressure-dropping labyrinth 140, corresponding to labyrinth 40 in FIG. 1. The flow-regulating region 126 in the device of FIGS. 9–10e is defined by cavity 144 extending through the opposite faces of an end section 116a of the body member, which end section receives the elastomeric sleeve 118. The inlet passageway into cavity 144 includes a plurality of narrow slits 130 communicating with the interior of tube 110 and leading to an inlet groove 132 of labyrinth 140 defined by the baffles 141 and the inner face of tube 110. A groove 142 leads from the outlet end of labyrinth 140 to a bore 143 leading into cavity 144. Another bore 148 leads from the cavity to an outlet chamber 154 which, when the device is fixed within tube 110, is aligned with a discharge hole 112 formed in that tube.

Bore 143 in the inlet passageway to the flow-regulating cavity 144, and bore 148 in the outlet passageway from this cavity, are both formed through the same section 146a of the peripheral wall 146 defining the cavity. The opposite faces of this section (and/or the other sections) of the peripheral wall are slanted or shaped to enable the elastomeric sleeve 118 to regulate the flow of water via the outlet bore 148 in response to the differential pressure on the opposite sides of the sleeve, substantially in the same manner as described above.

In the construction illustrated in FIGS. 9–10e, however, the elastomeric sleeve 118 may be of substantially smaller dimensions since it encloses only the flow-regulating region of the body member (cavity 144), and not the flow reducing region (baffles 141). In addition, the elastomeric sleeve is remote from the inner surfaces of the tube 110, and therefore cannot become attached to that surface or be influenced by water flow in the small space between the elastomeric sleeve and the inner face of the tube. The foregoing advantages tend to decrease the overall cost and to increase the reliability of the device.

The Embodiment of FIGS. 11–13

FIGS. 11–13 illustrate a flow reducer device similar to that of FIGS. 9–10e, except the body member, therein designated 216, is of cylindrical configuration so as to extend completely around the inner surface of the tube 210 when received therein. In this construction, the body member 216 also includes an end section 216a having a flow-regulating cavity 244 enclosed by an elastomeric sleeve 218.

Body member 216 is thus formed with a plurality of narrow inlet slits 230 communicating with the interior of tube 210 leading to a plurality of baffles 241 exending circumferentially around the body member and having outer faces engageable with the inner face of tube 210 to define the pressure reducing labyrinth passageway 240. This passageway leads to a bore 243 serving as the inlet to the flow-regulating cavity 244. The outlet from that cavity is via a bore 248 leading to an annular recess 254 defining, with the inner face of tube 210, an outlet chamber communicating with the discharge hole 212 formed in tube 210.

The construction and operation of the flow reducer device illustrated in FIGS. 11–13 are otherwise substantially the same as described above particularly with respect to FIGS. 9–10e.

While the invention has been described with respect to several preferred embodiments, it will be appreciated that these are set forth merely for purposes of example, and that many other variations, modifications and applications of the invention may be made.

I claim:

1. A flow reducer device attachable to a tube of pressurized fluid for reducing flow of a fluid therefrom, comprising: a body member formed with a fluid inlet, a fluid outlet, and a flow regulating region between said inlet and outlet;

said flow regulating region including a cavity extending through opposite faces of the body member closed by a side of a deformable diaphragm at each of said opposite faces;

said body member being further formed with an inlet passageway leading from said fluid inlet into the cavity, and an outlet passageway leading from said cavity to the fluid outlet;

said body member being formed with a plurality of baffles to define a labyrinth in said inlet passageway for reducing the pressure of the fluid flowing therethrough into said cavity;

said device being attachable to the tube of pressurized fluid such that an outer face of each diaphragm side is exposed to fluid pressure at said fluid inlet, and an inner face of each diaphragm side is exposed to fluid pressure within said cavity, whereby the diaphragm sides deform towards or away from each other within said cavity in response to changes in the inlet pressure to regulate the fluid flow via said cavity to said outlet passageway.

2. The device according to claim 1, wherein said cavity is circumscribed by a peripheral wall of said body member through which said inlet and outlet passageways are formed, and said deformable diaphragm sides are of elastomeric material received over outer opposite faces of said peripheral wall.

3. The device according to claim 2, wherein said outlet passageway includes an outlet bore formed through a section of the peripheral wall projecting inwardly into said cavity.

4. The device according to claim 3, wherein outer faces of said section of the peripheral wall are shaped to converge towards each other in the direction of said cavity.

5. The device according to claim 1, wherein said deformable diaphragm sides are opposite sides of an elastomeric sleeve enclosing said body member cavity.

6. The device according to claim 1, wherein said plurality of baffles are also enclosed by said elastomeric sleeve to define said labyrinth.

7. The device according to claim 1, wherein said plurality of baffles include outer surfaces engageable with an inner surface of the tube of pressurized fluid when attached thereto to define said labyrinth.

8. The device according to claim 1, wherein said body member is enclosed with a housing formed with an inlet connector leading to said fluid inlet of the body member and insertable through an opening in the tube, said housing being formed with an outlet leading to said outlet passageway of the body member through which the fluid is discharged.

9. A drip irrigation emitter, comprising:

a tube connectible to a source of pressurized water and formed with a plurality of discharge holes spaced longitudinally along the tube;

and a flow reducer device according to claim 1 fixed to an inner face of the tube for each of said discharge holes, with the fluid outlet of the body member in the respective device communicating with the respective discharge hole formed in said tube.

10. A flow reducer device attachable to a tube of pressurized fluid for reducing the flow of the fluid therefrom, comprising:

a body member formed with a fluid inlet, and a fluid outlet;

a cavity formed in said body member between said fluid inlet and fluid outlet;

an inlet passageway formed in said body member leading from said fluid inlet into the cavity;

an outlet passageway formed in said body member leading from said cavity to said fluid outlet;

and an elastomeric sleeve enclosing at least a portion of said body member to close said cavity at opposite faces of the body member such that opposite sides of the elastomeric sleeve serve as deformable diaphragms movable towards or away from each other within said cavity in response to changes in the pressure on an external face of said elastomeric sleeve as compared to the pressure within said cavity, to thereby regulate the fluid flow via said cavity to said outlet passageway; said cavity being circumscribed by a peripheral wall of said body member through which said inlet and outlet passageways are formed, said inlet passageway and outlet passageway being formed in the same side of said peripheral wall.

11. The device according to claim 10, wherein said outlet passageway includes an outlet bore formed through a section of said peripheral wall projecting inwardly into said cavity.

12. The device according to claim 10, wherein said body member is further formed with a plurality of baffles to define a labyrinth in said inlet passageway for reducing the pressure of the fluid flowing therethrough into said cavity.

13. The device according to claim 12, wherein said plurality of baffles are also enclosed by said elastomeric sleeve to define said labyrinth.

14. The device according to claim 12, wherein said elastomeric sleeve does not enclose said plurality of baffles, said plurality of baffles including outer surfaces engageable with an inner surface of the tube when attached thereto to define said labyrinth.

15. A drip irrigation emitter comprising:

a tube connectible to a source of pressurized water and formed with a plurality of discharge holes spaced longitudinally along the tube;

and a flow reducer device fixed to an inner face of the tube for each of said discharge holes, each of said flow reducer devices including:

a body member formed with a fluid inlet communicating with an interior of said tube, a fluid outlet communicating with a discharge hole of the tube, and a flow regulating region between the inlet and outlet;

said flow regulating region including a cavity exending through opposite faces of the body member; and a deformable diaphragm side closing each of said opposite faces of the body member, such that an outer face of each diaphragm side is exposed to the fluid pressure within said tube, and an inner face of each diaphragm side is exposed to the fluid pressure within said cavity, whereby the diaphragm sides deform towards or away from each other within the cavity in responses to change in pressure within the tube to regulate the flow via said cavity to the respective discharge hole of the tube;

said body member being further formed with a plurality of baffles to define a labyrinth between said inlet and cavity, said baffle including outer surfaces engaging the inner face of the tube to define said labyrinth, said elastomeric sleeve enclosing only a portion of said body member formed with said cavity.

16. The emitter according to claim 15, wherein said deformable diaphragm sides are opposite sides of an elastomeric sleeve including said body member cavity.

* * * * *